US005471570A

United States Patent [19]

Rackley et al.

[11] Patent Number: 5,471,570

[45] Date of Patent: Nov. 28, 1995

[54] HARDWARE XOR SPRITE FOR COMPUTER DISPLAY SYSTEMS

[75] Inventors: Darwin P. Rackley, Boca Raton, Fla.; R. Michael P. West, Colchester, Vt.

[73] Assignee: International Business Machines Corporation, Armonk, N.Y.

[21] Appl. No.: 176,128

[22] Filed: Dec. 30, 1993

[51] Int. Cl.[6] .......... G06T 11/00

[52] U.S. Cl. .......... 395/135; 395/133; 395/159

[58] Field of Search .......... 395/129, 131, 395/133, 135, 138, 155, 159, 161, 162, 164; 345/113, 114, 122, 150, 153–155, 152, 145, 157, 162, 22; 348/595

[56] References Cited

U.S. PATENT DOCUMENTS

| | | | |
|---|---|---|---|
| 3,609,749 | 9/1971 | McClelland | 345/157 |
| 3,911,419 | 10/1975 | Bates | 345/162 |
| 3,967,266 | 6/1976 | Roy | 345/162 |
| 4,467,322 | 8/1984 | Bell et al. | 345/22 |
| 4,580,134 | 4/1986 | Campbell et al. | 345/152 |
| 4,835,526 | 5/1989 | Ishii et al. | 345/195 |
| 4,951,038 | 8/1990 | Yamamura | 345/122 |
| 5,059,955 | 10/1991 | Yamamura | 345/153 |
| 5,185,597 | 2/1993 | Pappas et al. | 345/145 |
| 5,235,677 | 10/1993 | Needle et al. | 395/131 |
| 5,319,786 | 6/1994 | Yamamura | 395/164 X |
| 5,355,175 | 10/1994 | Okada et al. | 348/595 |

*Primary Examiner*—Almis R. Jankus
*Attorney, Agent, or Firm*—David L. McCombs

[57] ABSTRACT

Method and apparatus for adjusting the color of the sprite in display systems, so that the sprite is always distinctively visible irrespective of the underlying displayed data. A palette DAC of a display system is provided with sprite control logic, which derives the color of a sprite to be overlaid on an image displayed on a video display unit of a display system by inverting only the most significant bit (MSB) of each of the red, green and blue pixel data components of the underlying image. In a preferred embodiment, the sprite control logic circuit comprises first, second and third multiplexors (MUXes) each having a first input connected to receive the MSB of the red, green and blue pixel data components of the underlying image, respectively, and a second input connected to receive the output of first, second and third XOR gates, respectively. Each of the first, second and third XOR gates similarly have a first input connected to receive the MSB of the red, green and blue pixel data components of the underlying image, respectively, and a second input connected to receive sprite data from a sprite RAM, which sprite data represents a sprite character to be overlaid on the displayed image.

9 Claims, 2 Drawing Sheets

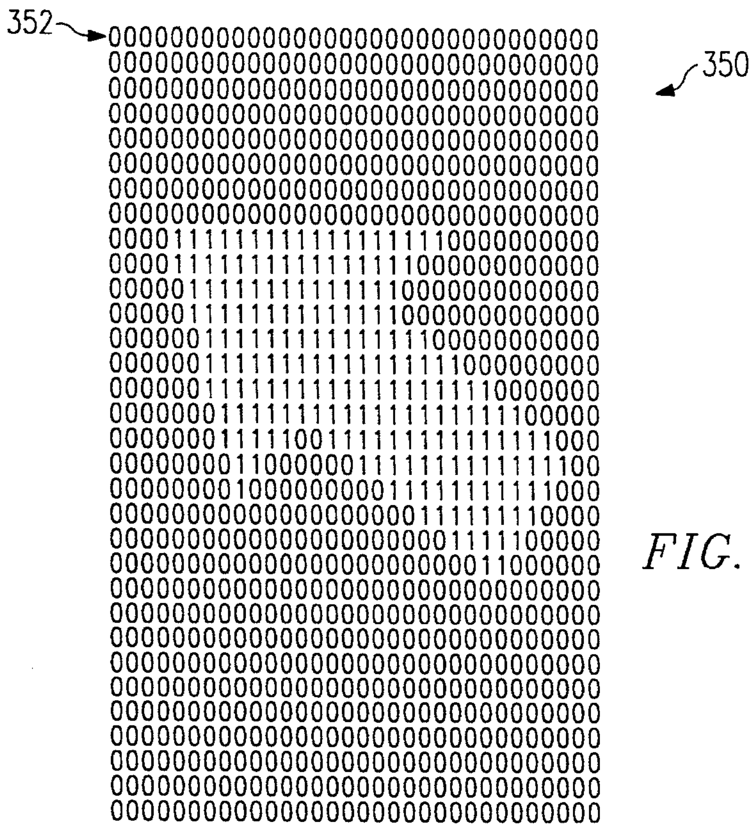
FIG. 3A
FIG. 4
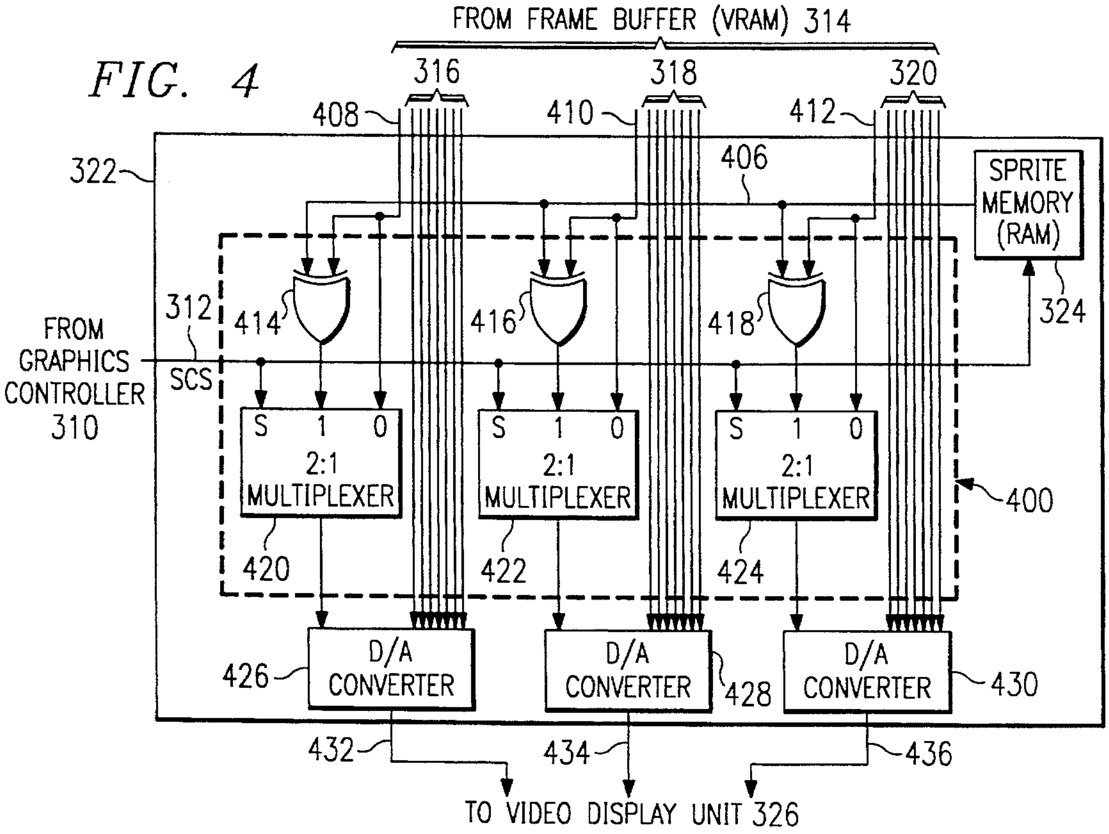

HARDWARE XOR SPRITE FOR COMPUTER DISPLAY SYSTEMS

TECHNICAL FIELD

The invention relates generally to the control of sprite color in computer display systems and more particularly, to an improved method and apparatus for adjusting the color of a sprite such that it is always distinctively visible against a displayed image upon which it is overlaid.

BACKGROUND OF THE INVENTION

Sprites, or cursors, are widely used in display systems as pointers to data displayed on a video display unit (VDU) of the system. Typically, a user controls the position of the sprite by means of an input device, such as a keyboard, mouse, or joystick. The image that the sprite displays is defined by a sprite character which is stored in an area of bit-mapped memory referred to as a sprite RAM. During typical operation, the sprite character overlays a portion of an image that would normally be displayed at the pixel position occupied by the sprite. A sprite character is stored in a sprite random access memory (RAM) and comprises a number of sprite data bits which are active (= 1) when the sprite is to be displayed at the particular pixel location and inactive (=0) when the underlying image is to be displayed. Sprites of fixed size are usually implemented in hardware such that their position on screen is controlled by X and Y position data generated by the input device and stored in X and Y position registers.

A common problem which arises in connection with the use of sprites in display systems is that it is often difficult to perceive the sprite, especially when the color of the sprite is close to that of the underlying display pixel data.

A solution to the above problem involves the use of a blinking circuit in conjunction with a sprite, which will cause the sprite to blink whenever it is displayed. Although this method improves the visibility of the sprite in some situations, it fails to do so when the color and intensity of the sprite is the same as or similar to the color and intensity of the image upon which the sprite is overlaid. In addition, it may be difficult to track a blinking sprite while it is being moved across a display screen, as the sprite will momentarily disappear at one point on the screen and then reappear shortly thereafter at another point on the screen.

Another solution to the above problem involves the use of a sprite in the form of an "underline," which is typically a bright, short line located below the lowest row of the character display area. However, while such an underline sprite is visible when used among large characters, it may be difficult to find in a group of closely spaced small characters, without excessive concentration.

Another solution to the above problem involves the use of what is commonly known as an exclusive OR (XOR) sprite. XOR sprites have attained great popularity in the recent years due to their partial success in insuring that the color of the sprite is different from that of the displayed image by inverting all bits of display pixel data underlying the active pixels of the sprite and using this inverted data as the sprite color.

XOR sprites, however, have certain disadvantages. First, the implementation of a conventional XOR sprite in display system not only slows down the system, but also increases the cost of the system, as a separate inverter, or XOR gate, is required to invert each bit of pixel data of the underlying image when the sprite is to be displayed. For example, implementing an XOR sprite in a 24-bit-per-pixel color display system would require twenty-four (24) XOR gates. Furthermore, although prior art XOR sprites are highly visible on certain color backgrounds, the visibility of an XOR sprite will be at a minimum when the color of the underlying image is a half intensity, or mid-level gray, represented by pixel data comprising 7F7F7Fh or 808080h. The reason for this is that when the bits of pixel data are converted, the resulting pixel data corresponds to another mid-level gray shade. For example, converting all the bits of pixel data comprising 7F7F7Fh (mid-level gray) results in pixel data comprising 808080h, which is also a mid-level gray. Coincidentally, such mid-level gray shades are is the most widely used color(s) in computer graphics applications.

Therefore, what is needed is a method and apparatus for adjusting the color of a sprite such that it is always visually distinguishable from the underlying image, even when the color of the underlying image pixels is a mid-level gray, while simultaneously reducing the cost of circuitry and increasing the speed of a display system in which it is implemented.

SUMMARY OF THE INVENTION

The foregoing problems are solved and a technical advance is achieved by a method and apparatus of the present invention for an improved XOR sprite, which consistently adjusts the color of the sprite such that it is always visually distinct from the underlying graphic image. In a departure from the art, rather than OR inverting each bit of pixel data of the underlying image to derive sprite color, only the most significant bits (MSBs) of each of the red, green and blue pixel data components are inverted. As a result, the color of the sprite will always differ by fifty percent (50%) of the full range of color for each color component of the underlying image, even when the underlying image is a half-intensity gray color.

In a preferred embodiment, the present invention comprises a sprite control logic circuit which is embodied in a palette digital-to-analog converter (DAC) of a display system. The sprite control logic circuit comprises first, second and third multiplexors (MUXes) each having a first input connected to receive the MSB of the red, green and blue component pixel data of the underlying image, respectively, and a second input connected to receive the output of first, second and third XOR gates, respectively. Each of the first, second and third XOR gates similarly have a first input connected to receive the MSB of the red, green and blue component pixel data of the underlying image, respectively, and a second input connected to receive sprite data from a sprite RAM, which sprite data comprises a sprite character to be overlaid on an image.

During operation, a sprite control signal from a graphics controller of the display system is activated when a raster beam of a video display unit (VDU) is at a pixel position at which the sprite character stored in the sprite RAM is to be displayed. Responsive to receipt of the sprite control signal, sprite data is output from the sprite RAM, one bit at a time, to the XOR gates. If the bit output the sprite RAM is a 1, indicating that the sprite character is to be displayed at the current pixel position, the output of each of the XOR gates will be the inverse of the MSB input thereto. Conversely, if the bit output the sprite RAM is a 0, indicating that the underlying image is to be displayed, the output of each of the XOR gates will be the same as the MSB input thereto.

The sprite control signal is also input to a select input of each of the MUXes and is used to select an input of the MUX. Specifically, when the sprite control signal is inactive, indicating that the raster scanning beam is at a pixel position at which the sprite is not to be displayed, the first input of each MUX will be selected and the non-XORed MSBs will be output the MUXes and recombined with their corresponding LSBs. Conversely, when the sprite control signal is active, indicating that the raster scanning beam is at a pixel position at which the sprite is to be displayed, the second input of each MUX will be selected and the XORed MSBs will be output the MUXes and recombined with their corresponding LSBs.

An important technical advantage achieved with the invention is that, because only the MSBs of each color component of the pixel data comprising the underlying image are converted, the sprite color will always differ by 50% of full range in each color component from the color of the background, even when the color of underlying image is a mid-level gray.

An additional technical advantage achieved with the invention is the reduction and simplification of circuitry which accompanies the elimination of the need to include an XOR gate for each bit of pixel data of the underlying image, as the sprite control logic circuit of the present invention requires only three XOR gates to derive the color of the sprite, regardless of the number of bits comprising the pixel data of the underlying image

BRIEF DESCRIPTION OF THE DRAWINGS

FIG. 3A are graphic illustrations of a sprite character as stored in a sprite random access memory of the display system of FIG. 3.

FIG. 4 is a schematic block diagram of a palette DAC of the display system of FIG. 3 embodying features of the present invention.

DESCRIPTION OF THE ILLUSTRATIVE EMBODIMENTS

Figure 1A:
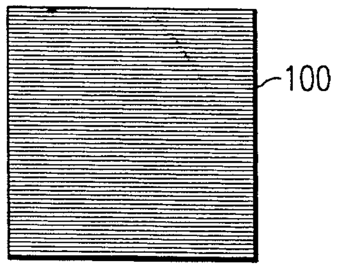
FIGS. 1A–1C are graphic illustrations of the operation of a prior art XOR sprite.
Figure 1B:
Figure 1C:
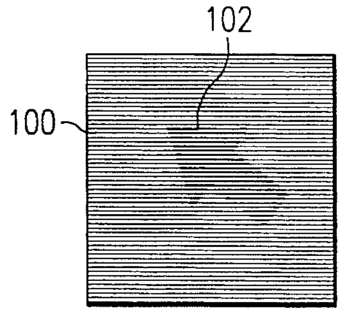

FIGS. 1A–1C illustrate the deficiencies of a prior art XOR sprite in a display system in which the color of each pixel comprising an image to be displayed is represented by 24 bits of pixel data, with eight bits of pixel data representing the intensities of each of the red, green and blue components of the pixel color. FIG. 1A illustrates a display of an image 100 in which all pixels are a mid-level gray color corresponding to pixel data having a value 808080h. As previously described, to derive sprite color, prior art XOR sprites invert each bit of pixel data at any pixel position in which the sprite is active. Therefore, when the bits of underlying pixel data are inverted to derive the sprite color, the data comprises 7F7F7Fh, which also represents a mid-level gray color. FIG. 1B illustrates such a sprite 102. As can be seen from FIG. 1C, when the sprite 102 is overlaid in the image 100, the color of the sprite 102 renders it virtually indistinguishable from the underlying image 100. Herein lies the problem that the present invention is designed to address.

Figure 2A:
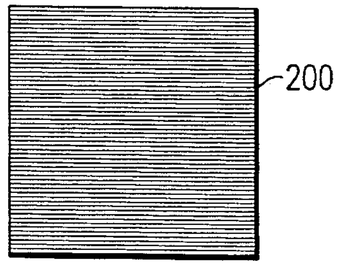
FIGS. 2A–2C are graphic illustrations of the operation of an XOR sprite implemented in accordance with the present invention.
Figure 2B:
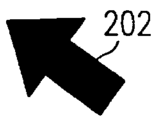
Figure 2C:
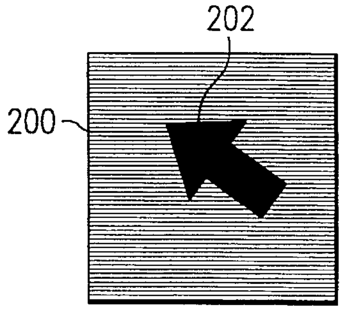

FIGS. 2A–2C illustrate an improved XOR sprite of the present invention, which is also implemented in a display system in which the color of each pixel comprising an image to be displayed is represented by 24 bits of pixel data, with eight bits of pixel data representing the intensities of each of the red, green and blue components of the pixel color. FIG. 2A illustrates a display of an image 200, which image 200 is identical in all respects to the image 100 and in which the pixel data for representing the color of each of the pixels comprises 808080h. As will be described in detail, rather than deriving sprite color by causing all of the bits of pixel data to be inverted at any pixel position in which the sprite is active, the present invention causes only the most significant bit (MSB) of each color component at that pixel position to be inverted. In the illustrated embodiment, in which the pixel data comprising each pixel of the image 200 is 808080h, inverting the MSB of each color component of each pixel results in a sprite color represented by 000000h, which corresponds to the color black, rather than mid-level gray. FIG. 2B illustrates such a sprite 202. FIG. 2C illustrates the sprite 202 overlaid on the image 200. Clearly, the sprite 202 in FIG. 2C is much more visible than the sprite 102 in FIG. 1C.

Additionally, assuming the pixels of the displayed image were a mid-gray color represented by pixel data comprising 7F7F7Fh, rather than 808080h, inverting the MSB of the pixel data for each color component to derive the sprite color in accordance with the technique of the present invention would result in sprite pixel data comprising FFFFFFh, which corresponds to the color white. Although not shown, it is obvious that a white sprite will be more than a mid-gray sprite when overlaid on a mid-gray image.

Figure 3:
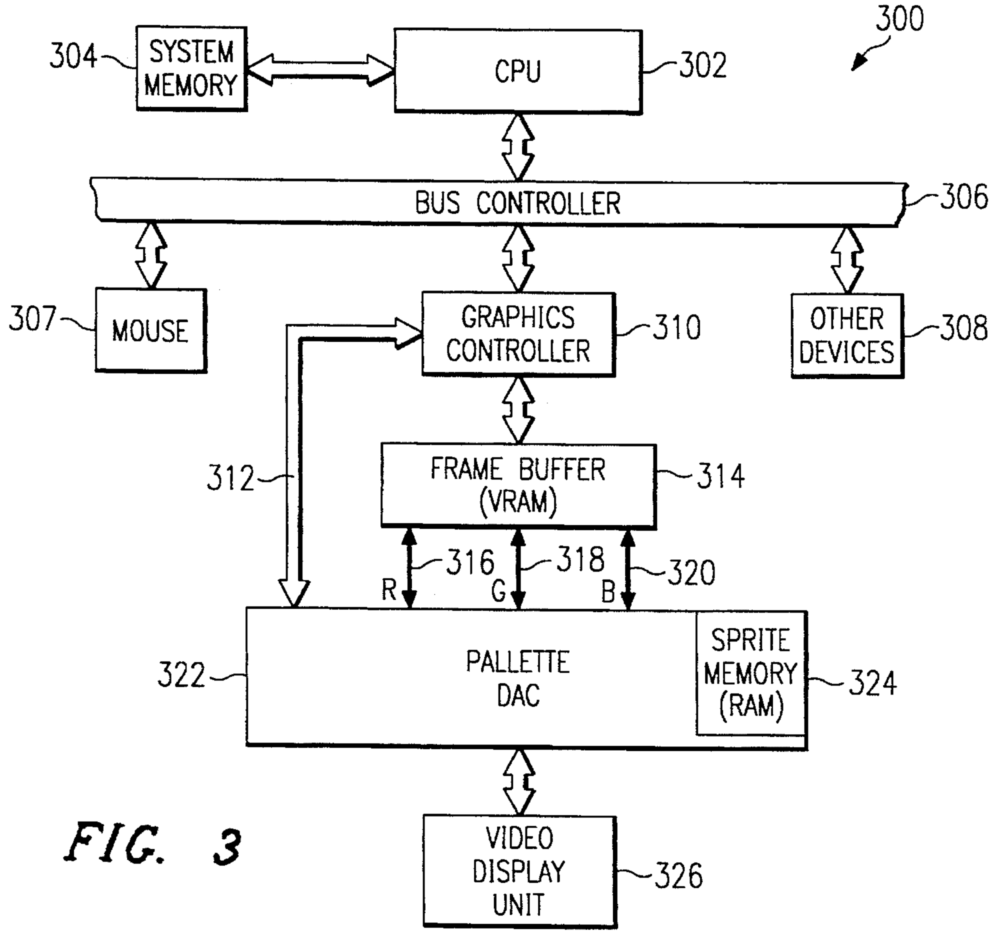
FIG. 3 is a schematic block diagram of a display system embodying features of the present invention.

Referring to FIG. 3, the reference numeral 300 designates a personal computer embodying features of the present invention. The system 300 includes a central processing unit 302, system random access memory (RAM) 304, a bus controller 306, a mouse 307, a graphics controller 310, a frame buffer 314, a palette DAC 322, which includes a sprite random access memory (RAM) 324, a VDU 326 and other devices designated by reference numeral 308 which are known by those skilled in the art to be necessary for a complete and operative system. System RAM 304 provides temporary storage for data and programs to be executed by the CPU 302. A bus controller 306 enables the exchange of information between the CPU 302, the mouse 307, the graphics controller 310 and other devices 308 in the system 300. A user may control the movement of a sprite, such as the sprite 202, using the mouse 307, which generates X and Y position signals to the CPU 302 indicative of a position of the sprite 202 on the VDU 326. The CPU 302 stores the X, Y position signals, or coordinates, in X and Y position registers (not shown) of the graphics controller 310, for purposes which will be described.

FIG. 3A is a representation of a sprite character 350 for generating a sprite, such as the sprite 202, on the VDU 326. The sprite character 350 is stored in the sprite RAM 324. In a preferred embodiment, the sprite character 350 is 32 pixels wide by 32 pixels long, although other sizes and shapes of sprite characters may be implemented. Each pixel comprising the sprite character 350 is represented by one bit of sprite data which indicates whether the sprite is active (i.e., sprite color is displayed) at that particular pixel position, in which case the sprite data bit will be a binary 1, or inactive (i.e., sprite color is not displayed) at the particular pixel position, in which case the sprite data bit will be a binary 0. It should be understood that the initial X, Y coordinates generated by the mouse 307 and stored in the X and Y position registers correspond to the position on the VDU 326 of the upper right hand corner 352 of the sprite character 350.

Referring again to FIG. 3, a CRT controller (not shown) connected to the graphics controller 310 compares the values stored in the X and Y position registers with the position of a raster scanning beam (not shown) of the VDU 326 as it moves from right to left and top to bottom across the VDU 326 to "paint" an image thereon. When it is determined that the raster scanning beam has reached the sprite character position, as indicated by the X, Y coordinates stored in the X and Y position registers, the graphics controller 310 will generate a "sprite control signal" (SCS) to the palette DAC 322, via a sprite control line 312, to activate the sprite and access the sprite data comprising the sprite character 350 stored in the sprite RAM 324. The SCS will remain active for the width of the sprite character 350, or 32 pixels. When the raster scanning beam passes the last pixel in the first row of the sprite character, the SCS is deactivated. This process is repeated for each line of the sprite character 350 until the raster scanning beam reaches the last pixel of the last line of the sprite character 350. While the SCS is active, the bits of sprite data comprising the sprite character 350 are sequentially accessed one bit at a time as the raster beam moves across the pixel positions on the VDU 326 at which the sprite is to be displayed and input to a sprite control logic circuit (FIG. 4), as will be subsequently described in detail.

Pixel data representing an image to be displayed on the VDU 326 is stored in the VRAM 314. In the preferred embodiment, the color of each pixel is represented in the VRAM 314 as 24-bits of data, wherein eight bits of data represent the intensities of each of red, green and blue components of the pixel color. During operation, the eight bit red, green and blue pixel data are output from the VRAM 314 to the palette DAC 322 via three eight-bit buses 316, 318 and 320, respectively. As will be described, after the digital pixel data is processed by a sprite control logic circuit (FIG. 4) of the present invention, the pixel data is converted by the palette DAC 322 to analog red, green and blue signals for driving the VDU 326.

FIG. 4 is a schematic block diagram of a preferred embodiment of the palette DAC 322 comprising a sprite control logic circuit 400 embodying features of the present invention. As previously described, eight-bit red, green and blue pixel data are input to the palette DAC 314 from the VRAM 314 via buses 316, 318 and 320, respectively. As previously indicated, when the raster beam reaches a pixel position on the VDU 326 at which the sprite character 350 is to be displayed, the SCS is activated and bits of sprite character data are accessed one bit at a time. Each accessed bit is output from the sprite RAM 324 and applied to an input of each of three XOR gates 414, 416 and 418 of the sprite control logic circuit 400 via line 406. Similarly, the MSB of each of the red, green and blue pixel data on the buses 316, 318 and 320, respectively, are applied to the other input of each of the XOR gates 414, 416 and 418 via lines 408, 410 and 412, respectively, as well as to input 0 of each of three multiplexors (MUXes) 414, 416 and 418, respectively. The outputs of XOR gates 414, 416 and 418 are applied to input 1 of each of the MUXes 420, 422 and 424, respectively. The SCS is applied to the select (S) input of each of the MUXes 414, 416 and 418 via the sprite control line 312 for purposes which will subsequently be described. The SCS is also applied to the sprite RAM 324 via the sprite control line 312.

The MSBs output from the MUXes 420, 422 and 424 are recombined with their respective LSBs on the buses 408, 410 and 412, respectively, and then input to digital to analog (D/A) converters 426, 428 and 430, respectively. The D/A converters 426, 428 and 420 convert the digital signals input thereto to analog red, green and blue signals, respectively, to be input to the VDU 326 via lines 432, 434 and 436, respectively.

In operation, if the bit output the sprite RAM 324 is a 0, indicating that the sprite color is not to be displayed at the corresponding pixel position, the output of the XOR gates 414, 416 and 418 will be the same as the MSB input on lines 408, 410 and 412, respectively. In other words, the MSBs are not inverted and the color of the pixel will be that of the underlying image. Alternatively, if the bit output the sprite RAM 324 on the line 406 is a 1, indicating that the sprite color is to be displayed at the corresponding pixel position, the XOR gates 414, 416 and 418 will invert the MSBs of the red, green and blue color components input thereto on lines 408, 410 and 412, respectively.

In a preferred embodiment, the SCS is used to select the XORed MSB (applied to input 1 of the MUXes 420, 422 and 424) or the non-XORed MSB (applied to input 0 of the MUXes 420, 422 and 424) of each of the red, green and blue pixel data components to be output from the MUXes 420, 422 and 424, respectively, to the D/A converters 426, 428 and 430, respectively, depending on whether or not the sprite character is active at the corresponding pixel position. In other words, if the raster is at a location on the VDU 324 at which the sprite character 350 is to be overlaid on the image, the graphics controller 310 will activate the SCS, thereby causing the XORed MSBs (input 1), which may or may not be inverted, depending on the state of the sprite data bit on line 406, to be output from each of the MUXes 420, 422 and 424. Alternatively, when the SCS is not active, i.e., when the sprite character is not to be displayed, the non-XORed MSB (input 0) will be selected and output each of the MUXes 420, 422 and 424. As a result, the MSB of each of the red, green and blue pixel data components will be inverted when the sprite color is to be displayed on the VDU 326, i.e., any time the SCS is active and the sprite data bit on line 406 is a 1.

As further illustrated below in Table I, the sprite control logic circuit 400 comprising the XOR gates 414, 416 and 418, and the MUXes 420, 422 and 424 insure that the sprite color is always distinctively visible against the underlying image. For example, so long as the SCS signal is inactive, input 0 of each of the MUXes 420, 422 and 424 will be selected, such that the MSBs on lines 408, 410 and 412 will be output from the MUXes 420, 422 and 424, respectively, to the D/A converters 426, 428 and 430, respectively. Conversely, when the SCS is active, input 1 of each of the MUXes 420, 422 and 424 will be selected and the state of the outputs of the MUXes 420, 422 and 424 will be controlled by the state of the sprite data bit on line 406. Accordingly, if the sprite data bit on line 406 is a 1, the XOR gates 414, 416 and 418 will invert the MSBs input thereto on lines 408, 410 and 412, respectively, and the signals output the MUXes 420, 422 and 424 and input to the D/A converters 426, 428 and 430, respectively, will be the inverted MSBs 408, 410 and 412. If the sprite data bit on line 406 is a 0 (sprite character inactive), the output of the XOR gates 414, 416 and 418 will be the same as the MSBs on lines 408, 410 and 412, respectively. As previously stated, the output of the MUXes 420, 422 and 424 are recombined with the LSBs on the buses 316, 318 and 320, respectively, before being input to the D/A converters 426, 428 and 430, respectively.

Table I below is a truth table illustrating the above-described operation of the present invention:

TABLE I

| SCS | Sprite Data | MSB | MUX output |
|---|---|---|---|
| 0 | 0 | 0 | 0 (not inverted) |
| 0 | 0 | 1 | 1 (not inverted) |
| 0 | 1 | 0 | 0 (not inverted) |
| 0 | 1 | 1 | 1 (not inverted) |
| 1 | 0 | 0 | 0 (not inverted) |
| 1 | 0 | 1 | 1 (not inverted) |
| 1 | 1 | 0 | 1 (inverted) |
| 1 | 0 | 1 | 0 (inverted) |

Using the example illustrated in FIGS. 2A–2C, if the color of a pixel comprising the image to be displayed is represented by 808080h, a value of 1000000b will be input to the sprite control logic circuit 400 on each of the buses 316, 318 and 320, respectively. The MSB of each of the color components, in this case 1, will be input to one input of the XOR gates 414, and 418 via lines 408, 410 and 412, respectively, as well as to input 0 of each of the MUXes 420, 422 and 424. Accordingly, when the SCS on line 312 is inactive, input 0 of the MUXes 420, 422 and 424 will be selected and a 1 will be output each of the MUXes 420, 422 and 424 and recombined with the corresponding LSBs, pixel data comprising 808080h, corresponding to a mid-gray color, will be input to the D/A converters 426, 428 and 430 collectively.

When the SCS signal is active, input 1 of the MUXes 420, 422 and will be selected and the state of the MUX outputs will be determined by whether the sprite character is inactive (sprite data bit=0) or active (sprite data bit=1) at the particular pixel location. For example, if the sprite character 350 is inactive, a 0 will be input to the other input of each of the XOR gates 414, 416 and 418, driving the output of the XOR gates 414, 416 and 418 and hence the output of the MUXes 420, 422 and 424, to 1. Again, when the MSBs output the MUXes 420, 422 and 424 are recombined with their corresponding LSBs, pixel data comprising 808080h, corresponding to a mid-gray color, will be input to the D/A converters 426, 428 and 430 collectively.

Alternatively, when the SCS signal is active, input 1 of the MUXes 420, 422 and 424 will be selected and the outputs will be determined by whether the sprite character is active or inactive at the particular pixel location. For example, of the sprite character 350 is active, a 1 will be input to the other input of each of the XOR gates 414, 416 and 418, driving the output of the XOR gates 414, 416 and 418 and hence the output of the MUXes 420, 422 and 424, to 0. In this case, when the MSBs are recombined with their corresponding LSBs, pixel data comprising 000000h, corresponding to black, will be input to the D/A converters 426, 428 and 430 collectively.

It should be understood with respect to the last case illustrated above that, if all of the bits of pixel data comprising the underlying image were inverted to derive the sprite pixel color, as would be the case with prior art XOR sprite techniques, the resulting sprite pixel data would comprise 7F7F7Fh, corresponding to a mid-gray color, which would not be clearly visible when overlaid upon the mid-gray image.

It is understood that variations may be made in the present invention without departing from the spirit and scope of the invention. For example, the inversion of the MSBs of each color component can either be performed just prior to the conversion of the digital pixel data into analog for the display unit 326 or while the pixel data is stored in the frame buffer VRAM 314. In addition, the technique of the present invention may be used not only in the present 24-bit display system, but also in systems with different resolutions. Furthermore, the XOR gates 414, 416, 418 may be replaced with other gating selection means which will change the color of the sprite relative to that of the pixel data. It is also understood that the components in the present invention may be incorporated as part of a VDU, graphics controller, or other display system component.

Although illustrative embodiments of the present invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. In a computer display system comprising a video display unit (VDU) and a video random access memory (VRAM) for storing pixels comprising an image to be displayed on said VDU and for outputting said pixels one at a time, an apparatus for controlling a color of a sprite overlaid on said displayed image, the apparatus comprising:

a sprite random access memory (RAM) for storing a plurality of sprite data bits corresponding to pixels of said sprite for indicating whether said corresponding pixels are active;

a first exclusive OR (XOR) gate having a first input connected said VRAM to receive a most significant bit (MSB) of a first color component of an image pixel output from said VRAM and a second input connected to an output of said sprite RAM;

a second XOR gate having a first input connected to receive an MSB of a second color component of said output pixel and a second input connected to receive said sprite RAM signal;

a third XOR gate having a first input connected to receive an MSB of a third color component of said output pixel and a second input connected to receive said sprite RAM signal;

a first multiplexor (MUX) having a first input connected to receive said first color component MSB, a second input connected to an output of said first XOR gate and a select input connected to receive a sprite control signal from said graphics controller, wherein a signal applied to said first input of said first MUX is output from said first MUX when said sprite control signal is inactive and a signal applied to said second input of said first MUX is output from said first MUX when said sprite control signal is active;

a second MUX comprising a first input connected to receive said second color component MSB, a second input connected to an output of said second XOR gate and a select input connected to receive said sprite control signal, wherein a signal applied to said first input of said second MUX is output from said second MUX when said sprite control signal is inactive and a signal applied to said second input of said second MUX is output from said second MUX when said sprite control signal is active;

a third MUX comprising a first input connected to receive said third color component MSB, a second input connected to an output of said third XOR gate and a select input connected to receive said sprite control signal, wherein a signal applied to said first input of said third MUX is output from said third MUX when said sprite control signal is inactive and a signal applied to said second input of said third MUX is output from said third MUX when said sprite control signal is active;

wherein when said sprite RAM signal is active, said first, second and third color component MSBs are inverted by said first, second and third XOR gates, respectively; and wherein when said sprite RAM signal is inactive, said first, second and third color component MSBs are throughput said XOR gates.

2. The apparatus of claim 1 further comprising:

a first digital-to-analog (D/A) converter having an MSB input connected to receive said signal output from said first logic circuit and a plurality of LSB inputs each connected to receive one of a plurality least significant bits (LSBs) of said first color component of said output pixel data word;

a second D/A converter having an MSB input connected to receive said signal output from said second logic circuit and a plurality of LSB inputs each connected to receive one of said plurality of LSBs of said second color component of said output pixel data word; and a third D/A converter having an MSB input connected to receive said signal output from said third logic circuit and a plurality of LSB inputs each connected to receive one of said plurality of LSBs of said third color component of said output pixel data word;

wherein said first, second and third D/A converters convert digital signals input thereto to an analog form of said first, second and third color components, respectively, for driving said VDU.

3. Apparatus for controlling the color of pixels of a sprite overlaid on a portion of an image displayed on a video display unit (VDU) of a computer display system such that said sprite is visibly distinct from said displayed image, said computer display system including a graphics controller for activating a sprite control signal when a raster scanning beam of said VDU is at a pixel position on said VDU corresponding to said image portion upon which said sprite is overlaid and a video random access memory (VRAM) for storing said image in digital form such that each pixel of said image is stored as a word of image pixel data comprising at least one color component, and for outputting an image pixel data word of an image pixel to be displayed at said raster scanning beam pixel position, the apparatus comprising:

a sprite random access memory (RAM) for storing a plurality of sprite data bits, wherein each of said sprite data bits corresponds to one of said sprite pixels and indicates whether said corresponding one of said sprite pixels is active;

at least one logic gate having a first input electrically connected to said VRAM for receiving a most significant bit (MSB) of said at least one color component of said output image pixel data word and a second input electrically connected to an output of said sprite RAM;

at least one logic circuit having a first input electrically connected to said VRAM for receiving said at least one color component MSB of said output image pixel data word, a second input electrically connected to an output of said at least one logic gate, and a third input electrically connected to said graphics controller for receiving said sprite control signal therefrom;

wherein responsive to said sprite control logic signal being active, said sprite RAM outputs one of said sprite data bits corresponding to said raster scanning beam pixel position to said second input of said at least one logic gate;

wherein responsive to said output one of said sprite data bits comprising a 0, said at least one logic gate outputs said at least one color component MSB of said output image pixel data word;

wherein responsive to said output one of said sprite data bits comprising a 1, said at least one logic gate inverts said at least one color component MSB of said output image pixel data word and outputs said inverted at least one color component MSB of said output image pixel data word;

wherein responsive to said sprite control signal being inactive, said at least one logic circuit outputs a signal applied to said first input thereof; and wherein further responsive to said sprite control signal being active, said at least one logic circuit outputs a signal applied to said second input thereof.

4. The apparatus of claim 3 further comprising:

at least one digital-to-analog (D/A) converter having an MSB input connected to receive said signal output from said first logic circuit and a plurality of LSB inputs each connected to receive one of a plurality of least significant bits (LSBs) of said at least one color component of said output image pixel data word, said at least one D/A converter converting said at least one color component input thereto to analog form for driving said VDU.

5. The apparatus of claim 3 wherein said at least one logic gate comprises an exclusive OR (XOR) gate.

6. The apparatus of claim 3 wherein said at least one logic circuit comprises a 2×1 multiplexor (MUX).

7. The apparatus of claim 6 wherein said third input of each of said at least one logic circuit comprises a select input.

8. Apparatus for controlling a color of a sprite overlaid on an image displayed on a video display unit (VDU) of a computer display system such that said sprite is always visibly distinct from said displayed image, said computer display system including a graphics controller for selectively activating a sprite control signal for initiating display of said sprite and a video random access memory (VRAM) for storing said image in digital form in which each pixel of said image is represented by a word of pixel data comprising first, second and third color components, and for sequentially outputting pixel data words, the apparatus comprising:

a sprite random access memory (RAM) for storing a plurality of sprite data bits, wherein each of said sprite data bits corresponds to a pixel of said sprite and indicates whether said corresponding sprite pixel is active;

a first logic gate having a first input electrically connected to said VRAM for receiving said first color component MSB of a pixel data word output from said VRAM and a second input electrically connected to an output of said sprite RAM;

a second logic gate having a first input electrically connected to said VRAM for receiving said second color component MSB of said output pixel data word and a second input electrically connected to said sprite RAM output;

a third logic gate having a first input electrically connected to said VRAM for receiving said third color component MSB of said output pixel data word and a second input electrically connected to said sprite RAM output;

a first logic circuit having a first input electrically connected to said VRAM for receiving said first color component MSB of said output pixel data word, a second input electrically connected to an output of said first logic gate, and a third input electrically connected to said graphics controller for receiving said sprite control signal therefrom;

a second logic circuit having a first input electrically connected to said VRAM for receiving said second color component MSB of said output pixel data word, a second input electrically connected to an output of said second logic gate and a third input electrically connected to said graphics controller for receiving said sprite control signal therefrom and;

a third logic circuit having a first input electrically connected to said VRAM for receiving said third color component MSB of said output pixel data word, a second input electrically connected to an output of said third logic gate and a third input electrically connected to said graphics controller for receiving said sprite control signal therefrom;

wherein responsive to said sprite control logic signal being active, said sprite RAM outputs one of said sprite data bits said second input of each of said first, second and third logic gates;

wherein responsive to said output one of said sprite data bits indicating that said corresponding sprite pixel is inactive, said first, second and third logic gates output said first, second and third color component MSBs of said output pixel data word, respectively;

wherein responsive to said output one of said sprite data bits indicating that said corresponding sprite pixel is active, said first, second and third logic gates invert said first, second and third color component MSBs of said output pixel data word, respectively, and output said inverted first, second and third color component MSBs of said output pixel data word, respectively;

wherein responsive to said sprite control signal being inactive, said first, second and third logic circuits respectively output signals applied to said first inputs thereof; and wherein further responsive to said sprite control signal being active, said first, second and third logic circuits respectively output signals applied to said second inputs thereof.

9. The apparatus of claim 8 further comprising:

a first digital-to-analog (D/A) converter having an MSB input connected to receive said signal output from said first logic circuit and a plurality of LSB inputs each connected to receive one of a plurality least significant bits (LSBs) of said first color component of said output pixel data word;

a second D/A converter having an MSB input connected to receive said signal output from said second logic circuit and a plurality of LSB inputs each connected to receive one of said plurality of LSBs of said second color component of said output pixel data word; and a third D/A converter having an MSB input connected to receive said signal output from said third logic circuit and a plurality of LSB inputs each connected to receive one of said plurality of LSBs of said third color component of said output pixel data word;

wherein said first, second and third D/A converters convert digital signals input thereto to an analog form of said first, second and third color components, respectively, for driving said VDU.

* * * * *